US012592783B2

(12) United States Patent　　　(10) Patent No.:　US 12,592,783 B2
Saffman　　　　　　　　　　　　　　(45) Date of Patent:　Mar. 31, 2026

(54) OPTICAL ROUTING NETWORK-BASED QUANTUM ARRAY CONTROL

(71) Applicant: ColdQuanta, Inc., Boulder, CO (US)

(72) Inventor: Mark Saffman, Madison, WI (US)

(73) Assignee: ColdQuanta, Inc., Boulder, CO (US)

( * ) Notice: Subject to any disclaimer, the term of this patent is extended or adjusted under 35 U.S.C. 154(b) by 1079 days.

(21) Appl. No.: 17/675,854

(22) Filed: Feb. 18, 2022

(65) Prior Publication Data

US 2023/0163859 A1　　May 25, 2023

Related U.S. Application Data

(60) Provisional application No. 63/281,995, filed on Nov. 22, 2021.

(51) Int. Cl.
*G06N 10/40*　　　(2022.01)
*G02F 1/21*　　　(2006.01)
*H04B 10/70*　　　(2013.01)

(52) U.S. Cl.
CPC ............. *H04B 10/70* (2013.01); *G02F 1/212* (2021.01); *G06N 10/40* (2022.01)

(58) Field of Classification Search
CPC ........ H04B 10/70; G02F 1/212; G06N 10/40; G02B 6/29334
See application file for complete search history.

(56) References Cited

U.S. PATENT DOCUMENTS

| | | | |
|---|---|---|---|
| 11,112,564 B2 | 9/2021 | Steinbrecher | |
| 2003/0123122 A1* | 7/2003 | Nakamura | ............ G02F 1/0327 |
| | | | 359/248 |
| 2011/0249936 A1 | 10/2011 | Welch | |
| 2011/0262149 A1* | 10/2011 | Terada | ................... H04B 10/60 |
| | | | 398/202 |
| 2015/0354938 A1 | 12/2015 | Mower | |
| 2021/0337171 A1 | 10/2021 | Saffman | |

(Continued)

FOREIGN PATENT DOCUMENTS

| | | | | |
|---|---|---|---|---|
| WO | WO-2014100831 A1 * | 6/2014 | ........ B01L 3/502715 |
| WO | 2020056324 | 3/2020 | |

OTHER PUBLICATIONS

Lim et al. "Design and Fabrication of Grating Couplers for the Optical Addressing of Trapped Ions", IEEE Photonics Journal, Aug. 2021, pp. 6.*

(Continued)

*Primary Examiner* — Li Wu Chang
(74) *Attorney, Agent, or Firm* — Michael J. Attisha; Samuel Means; Greenberg Traurig, LLP

(57) ABSTRACT

A quantum computer system uses a network of Mach-Zehnder interferometers (MZIs) to route laser light to selected atoms of a quantum array. The MZI network is defined in a photonic integrated circuit (PIC), which also includes an array of optical gratings. A laser system generates the light, the electronically controlled MZI network routes the light to respective optical gratings. The optical gratings convert the light from the MZI network into beams to illuminate the respective atoms so as to conditionally change their quantum states. This routing process offers advantages of economy, scalability and reliability over alternatives approaches to optical control of quantum states.

10 Claims, 4 Drawing Sheets

(56) References Cited

U.S. PATENT DOCUMENTS

2024/0403686 A1* 12/2024 Ikuta .......................... H04L 9/12

OTHER PUBLICATIONS

Kim et al. "Grating Cavity Laser Integrated Mach-Zehnder Inter-ferometers for Tunable Wavelength Conversion", SPIE vol. 6352, 2006, pp. 8.*

Gillen-Christandl et al., Comparison of Gaussian and Super Gauss-ian Laser Beams for Addressing Atomic Qubits, Apr. 4, 2016, pp. 1-39.

Knoernschild et al., Independent Individual Addressing of Multiple Neutral Atom Qubits with a MEMS Beam Steering System, Jun. 14, 2010, pp. 1-9.

Yavuz et al., Fast Ground State Manipulation of Neutral Atoms in Microscopic Optical Traps, Sep. 23, 2005, pp. 1-4.

Zadka et al., On-Chip Platform for a Phased Array with Minimal Beam Divergence and Wide Field-of-View, Optics Express, vol. 26, No. 3, Feb. 5, 2018, pp. 2528-2534.

* cited by examiner

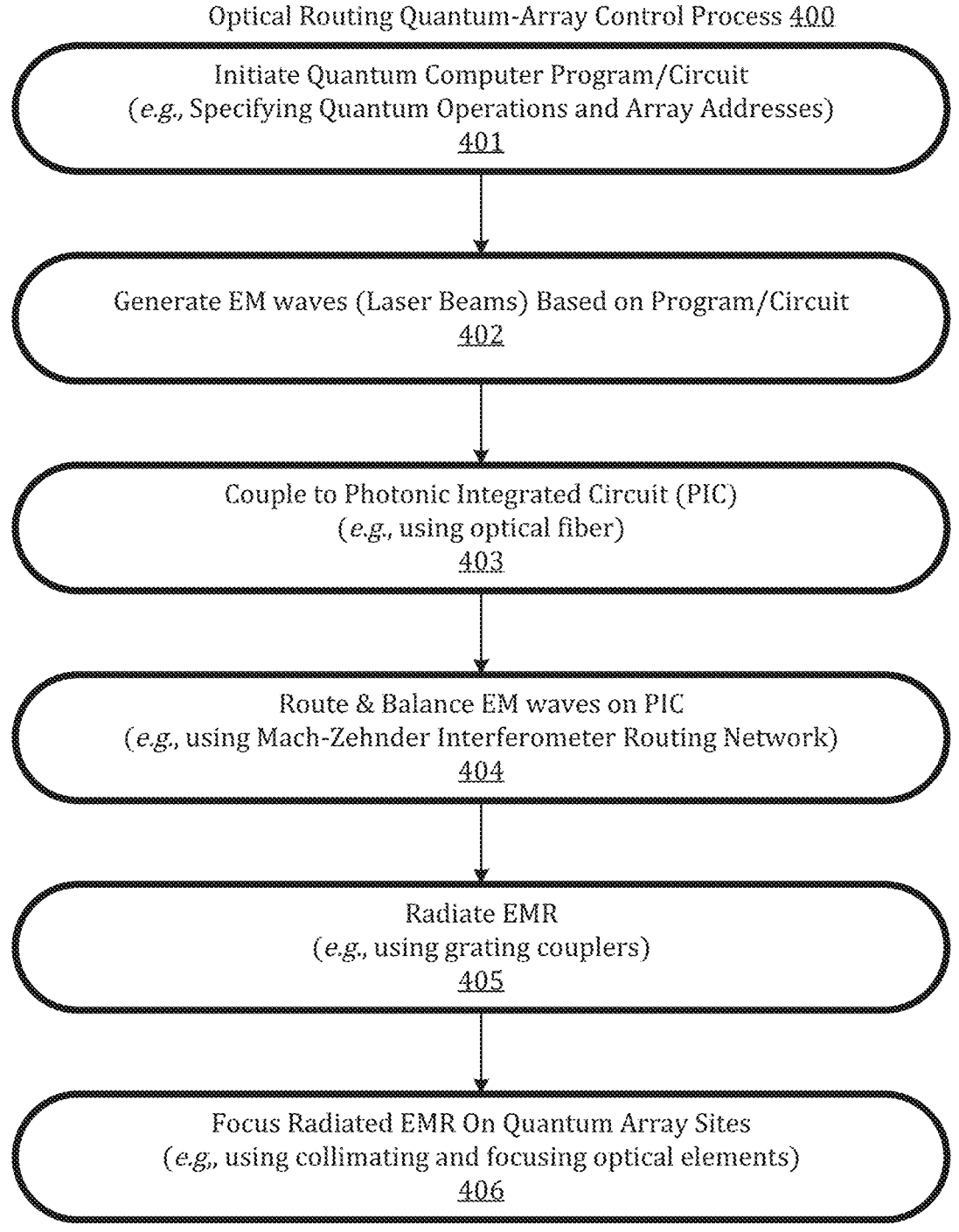

Optical Routing Quantum-Array Control Process 400

Initiate Quantum Computer Program/Circuit
(*e.g.*, Specifying Quantum Operations and Array Addresses)
401

Generate EM waves (Laser Beams) Based on Program/Circuit
402

Couple to Photonic Integrated Circuit (PIC)
(*e.g.*, using optical fiber)
403

Route & Balance EM waves on PIC
(*e.g.*, using Mach-Zehnder Interferometer Routing Network)
404

Radiate EMR
(*e.g.*, using grating couplers)
405

Focus Radiated EMR On Quantum Array Sites
(*e.g.*, using collimating and focusing optical elements)
406

FIG. 4

OPTICAL ROUTING NETWORK-BASED QUANTUM ARRAY CONTROL

BACKGROUND

Whereas classical digital computers manipulate units, e.g., bits, of classical information, quantum computers manipulate units, e.g., qubits, of quantum information. Both classical bits and quantum qubits can be represented physically using two-state carriers. Examples of two-state quantum carriers include an electron that can transition between a spin up and a spin down state, and an electron in an atom that can transition between hyperfine ground states. A classical two-state carrier assumes one of the two states (e.g., respectively representing a logic-0 and a logic-1) at any given time; a quantum two-state carrier can be in a coherent superposition of both states simultaneously.

Qubits can be represented by a variety of quantum-state carriers, including superconducting circuits, color centers in a solid-state host (e.g., nitrogen-vacuum centers in diamond), quantum dots, neutral atoms, ions, and molecules. Ions and neutral atoms of a given isotope are, by their nature, all identical and, so, have an advantage over manufactured alternatives. However, while closely spaced ions generally interact with their neighbors due to Coulomb forces, interactions between closely packed neutral atoms can be switched on and off, e.g., by making them enter and exit Rydberg states. Accordingly, cold atoms provide a favorable technology for implementing dense qubit arrays.

The quantum state of atoms can be controlled by electromagnetic radiation (EMR), for example, near infrared and visible light. Control of selected atoms within a dense atom array is possible by focusing laser light to a spot with radius smaller than the pitch, e.g., one to three microns, for atoms in an array. There are several technologies that have been used for steering and focusing laser light for quantum-state control. However, it has proven difficult to scale these technologies economically to keep up with demand for larger quantum arrays. What is needed is a more economically scalable approach to address atoms in a quantum array.

BRIEF DESCRIPTION OF THE DRAWINGS

FIG. 4 is a flow chart of an optical routing quantum-array control process implementable on the quantum computing system of FIG. 1 and on other systems.

DETAILED DESCRIPTION

The present invention provides for control of a quantum array over an optical routing network. The invention applies to arrays of quantum-state carriers (QSCs) with optically controllable quantum states such as neutral atoms, molecules, ions, quantum dots in a semiconductor host, and color centers in a solid-state host (e.g., nitrogen-vacuum centers in diamond). The optical routing network can be used to route electromagnetic (EM) waves to a selected array site to control the quantum state of the resident QSC (which, in turn, may affect one or more quantum states of respective neighboring QSCs).

Compared to steering-based approaches (e.g., using micro-mechanical machine (MEMS) mirrors, the present invention provides for cost-effective, accurate, and scalable control of quantum array states. These advantages arise in part due to the availability of optical routing networks in photonic integrated circuits (PICs), which leverage much of the technology and economies of scale developed over decades for electronic integrated circuits (ICs). Depending on the embodiment, the base material for the PICs can include silicon and silicon dioxide, lithium niobate (LiNbO$_3$), gallium arsenide (GaAs), indium phosphide (InP), and others.

Figure 1:
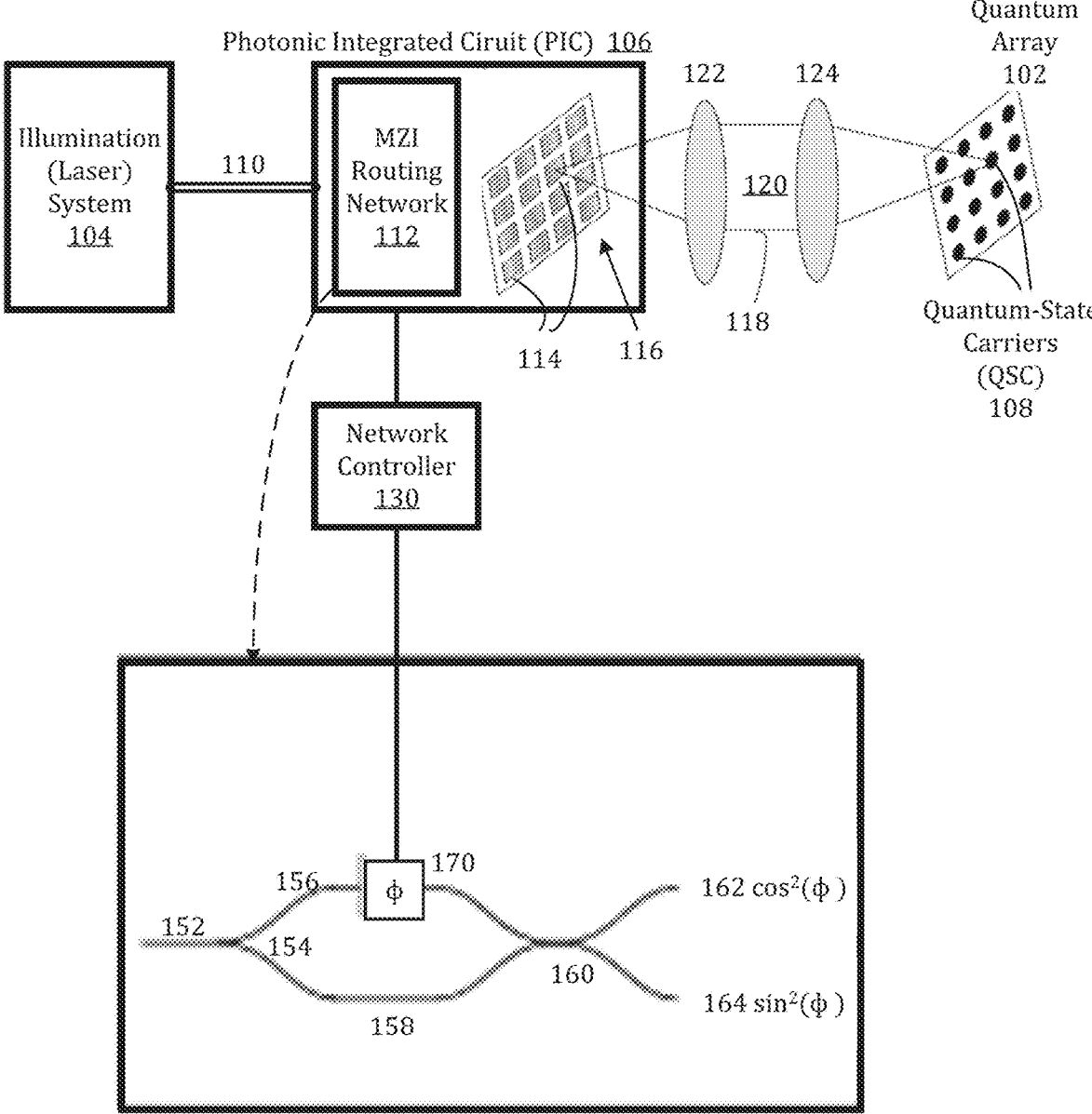
FIG. 1 is a schematic illustration of a quantum computing system that routes electromagnetic waves to quantum-state carriers using a multi-stage routing network of Mach-Zehnder interferometers (MZIs).

For example, a quantum system 100, represented in FIG. 1, includes a quantum array 102, an illumination (e.g., laser) system 104, and a photonic integrated circuit (PIC) 106 for routing EM waves generated by illumination system 104 to respective QSCs 108 in array 102. For expository purposes, quantum array 102 is depicted in FIG. 1 as a four-by-four array of QSCs; in practice, much larger arrays are commonly used.

An optical coupling 110 (e.g., including one or more polarization-maintaining single-mode (PM/SM) optical fibers) guides EM waves output from illumination system 104 to PIC 106. A Mach-Zehnder interferometer (MZI) routing network 112 on PIC 106 routes the received EM waves to respective EM radiators, in this case, grating couplers 114 of a radiator array 116. Each grating coupler 114 coverts in coming EM waves into outgoing electromagnetic radiation (EMR) beams 118, e.g., light beams, that propagate normal to the grating surfaces and are imaged onto the array of QSCs to (at least conditionally) alter QSC quantum states. An array coupling 120, e.g., including a collimating lens 122 and a focusing lens 124, focuses the EMR respective QSC sites of quantum array 102. A network controller 130 provides for (e.g., electronic) control of EM-wave routing by MZI network routing network 112.

As noted above, routing network 112 is a network of MZIs. A representative MZI 151 is shown in the detail of FIG. 1. MZI 151' includes an input 152 for receiving an EM wave, an optical coupling 154, branches 156 and 158, an optical coupling serving as a combiner 158 for interfering EM waves from branches 156 and 158, and two outputs 160 and 162 for the interference results. Optical coupling distributes an incoming EM wave evenly between branches 156 and 158, while the distribution at the outputs is controllable, as explained below.

Upper branch 156 includes a variable delay element 170. Network controller 120 is coupled to delay element 170 so that it can control (e.g., electronically) the phase difference $\phi$ between branches 156 and 158 for MZI 151, just as it controls phase differentials for all MZIs of routing system 112. The EM waves in branches 156 and 158 interfere at optical coupling 160. The phase difference determines the power distribution $\phi$ at output 162 which gets $\cos^2(\phi)$ and output 164 which gets $\sin^2(\phi)$. Thus, in the event that the EM waves in the branches are in phase, then $\phi=0$ and the lower output signal is cancelled so that the entire input signal is output using upper output 162. More generally, network controller 120 can control the output power distribution of MZI 151 so that EM power can be distributed losslessly in any desired manner between the outputs.

Figure 2:
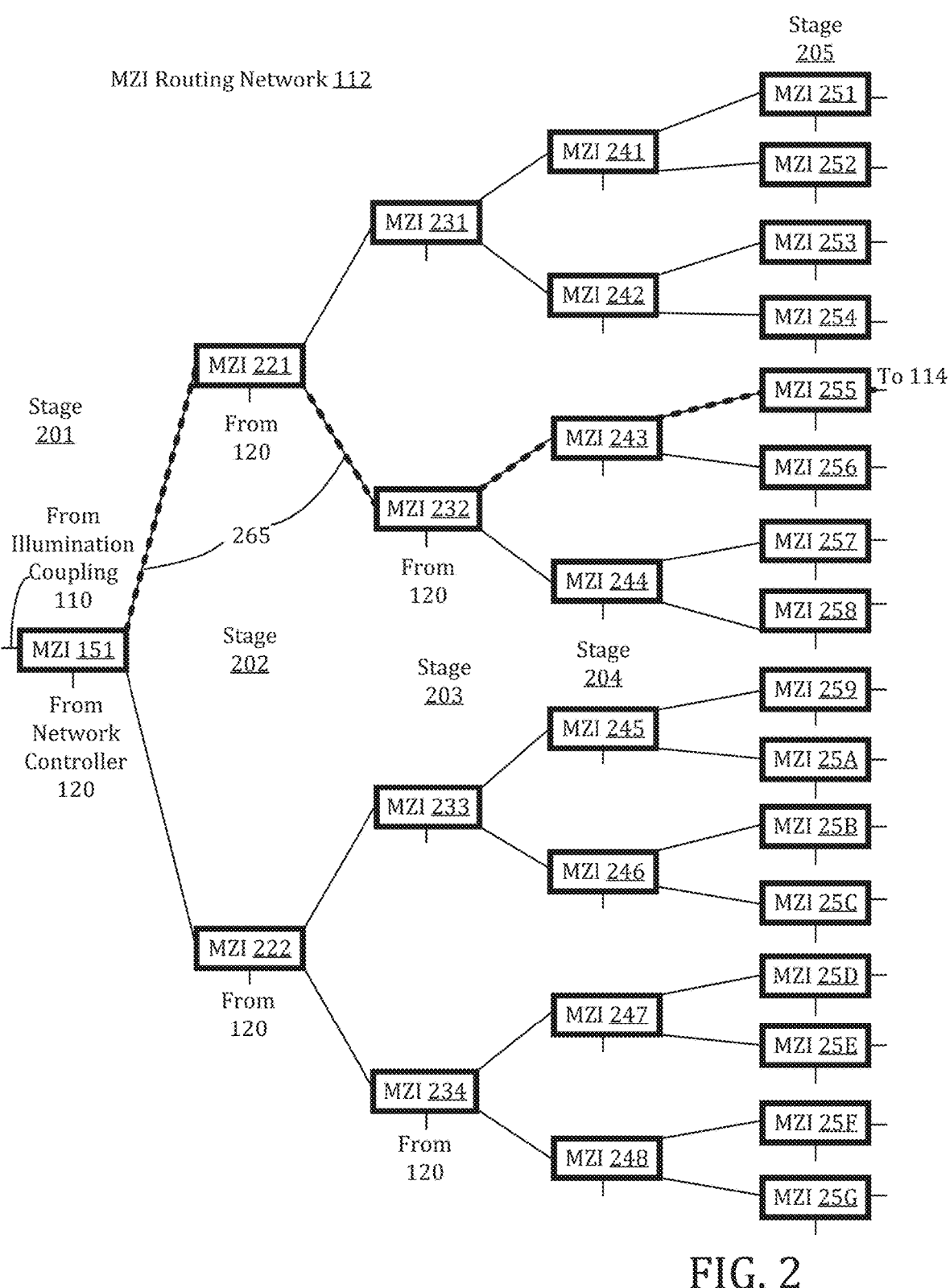
FIG. 2 is a network diagram of the MZI routing network of FIG. 1.

All other MZIs of routing network 112 operate as MZI 151 operates except that the output corresponding to output 164 is blocked for MZIs in the last stage of the illustrated MZI routing network as indicated in FIG. 2. In the latter case, the phase difference between branches is controlled to determine an amount of attenuation applied to the one (unblocked) output.

MZI routing network 112 is arranged in stages including a first stage 201, intermediate stages 202-204, and a final stage 205 as shown in FIG. 2. First stage 201 includes one MZ1 151 arranged to receive EM waves over illumination coupling 110, as well as a phase control signal from network controller 130. All first and intermediate stage MZIs provide outputs to an immediately succeeding stage, while all intermediate and final stage MZ1s receive inputs from MZIs of the immediately preceding state. First stage MZI 151 outputs a quadrature (?) pair of output signals, either can transmit none, some, or all of the power (depending on the EM wave input and phase settings) associated with the waves in the branches.

Second stage 202 includes MZIs 221 and 222, each arranged to receive illumination from respective outputs from first stage MZI 151 as well as respective phase control signals from network controller 130. Each of MZIs 221 and 222 outputs a quadrature pair of output signals for a total of four second stage 202 output signals. The four outputs of second stage 202 are respectively received by four MZIs 231, 232, 233, and 234 of third stage 203, yielding two outputs for each of the four MZIs for a total of eight third-stage outputs. The resulting eight outputs of third stage 203 are respectively received by eight MZIs 241-248 of the fourth switch network stage 204. As with prior stages, the number of outputs can be double the number of MZIs so that the fourth stage 204 of MZI-routing network 112 has 16 outputs.

The 16 outputs of MZI routing network 112 are respectively received by 16 MZ1s of fifth and final-stage MZI. Final stage 205 serves to equalize the outputs of MZI routing network 112 by making final attenuation adjustments, e.g., to balance the power outputs across the routing network outputs to radiator (gated couplings) array 114 (FIG. 1). The attenuation adjustments are based on the phase shifts determined by phase control signals from network controller 130. In an embodiment not requiring such balancing or power control or in an embodiment where such control is achieved in an alternative way, such a balancing/attenuating stage can be omitted. In such embodiments, the final stage can have MZIs with two outputs with each output coupled to a respective grating coupler. For example, each of the sixteen outputs of fourth stage 204 can include a variable attenuator if fifth stage 205 is omitted.

MZI routing network 112 thus permits an optical signal received at first stage MZI 151 to any selected one or more of the 16 final-stage MZIs 251, 252, 253, 254, 255, 256, 257, 258, 259, 25A, 25B, 25C, 25D, 25E, 25F, and 25G. For example, phase control signals from network controller 120 can be used to route an optical signal from first stage MZI 151 along a route 265 through second stage MZI 221, third stage MZI 232, fourth stage MZI 243, and fifth and final stage MZI 254. In alternative embodiments, the first stage can have more than one MZI and there can be fewer or more than three intermediate stages.

Figure 3:
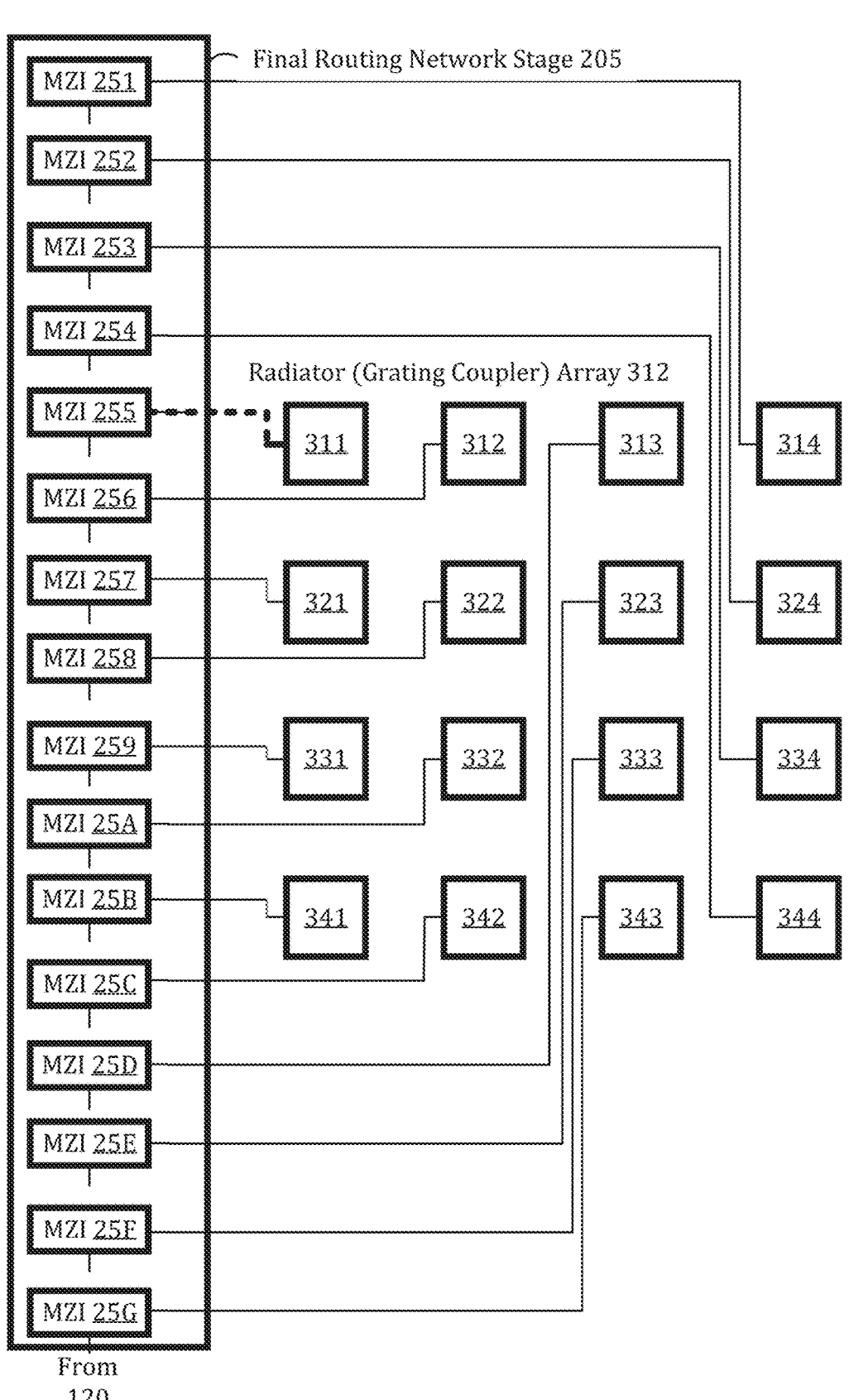
FIG. 3 is a diagram showing connections between a last stage of the multi-stage routing network of FIG. 1 and an array of gradient couplers of the quantum computing system of FIG. 1.

Grating couplers 311-344 of radiator array 312 are arranged to receive EM waves from respective MZIs 251-25G of the final stage 205 of routing network 112. EM waves received by grating couplers 311-344 is radiated orthogonally out of the page of FIG. 3, and toward quantum array 102 (FIG. 1). Each grating coupler 311-344 is optically coupled to a respective site of quantum array 102 so that only the coupled site receives the illumination transmitted from the respective grating coupler. Thus, PIC EMR router 106 (FIG. 1) makes it possible to route EMR to zero, one, some, or all QSCs of quantum array 102 based on phase control signals from network controller 120.

An optical routing quantum-array control process 400 is flow charted in FIG. 4. At 401, a quantum computer program, e.g., a quantum circuit, is initiated. Typically, the program specifies operations and array addresses. At 402, EM waves, e.g., laser beams, are generated based on the quantum computer program. At 403, the EM waves are coupled to the PIC, e.g., including an electronically controlled MZI routing network and an array of EM radiators, e.g., grating couplers.

At 404, the EM waves are routed to or toward a device that radiates EMR toward a QSC in the quantum array; enroute the EM waves can be attenuated by respective amounts, e.g., using a routing network final stage with single-output MZIs. For example, the attenuation can be selected to power balance the EM waves arriving at the EM radiators. Alternatively, the balancing can be omitted or implemented in an alternative approach. At 405, EMR is radiated toward the respective QSC, e.g., using the EM radiators. At 406, the radiated EMR is focused on the respective QSC, e.g., using collimating and focusing lenses or other optical elements. In a scenario, the switch network is used to map one input to one output. However, the routing network can route one input to two or more or even all outputs with equal power.

Quantum computer system 100 (FIG. 1) can be modified in a number of ways to accommodate different objectives. For example, the first routing network stage can have more than one MZI so that multiple EMR inputs can be accepted, which may be of the same wavelength or different wavelengths so that illumination can be distributed among QSCs in different ways. Concurrent illumination signals can be time-aligned by adding delays in the outputs of some MZIs. For example, each switch network MZI can have a delay coupled to one or both of its outputs.

The illustrated quantum array is square and two dimensional. Alternative embodiments use rectangular and other shape arrays of QSCs and/or EM radiators (e.g., grating couplings) and provide for arrays of fewer (e.g., 1) or more (e.g., 3) dimensions. In various embodiments, the EM wavelengths of interest can range from 10 nm to 10,000 nm. In various embodiments, the QSCs can include atoms, molecules, ions, color centers in solid-state hosts, or quantum dots in a semiconductor host.

In the illustrated embodiment, the spatial mode of the beam exiting each grating coupler is a Gaussian with intensity profile $I=\exp(-2r^2/w^2)$ where r is the distance from the center of the grating coupler and w is the beam waist. In alternative embodiments, the spatial mode is a higher order Gaussian, often denoted as a "super-Gaussian", of the form $I=\exp(-2r''/w'')$ with n>2. Such a super-Gaussian profile is useful for achieving QSC control with high fidelity that is insensitive to errors in alignment of the optical beam onto the qubit. In other embodiments, the spatial mode approximates a uniform intensity that does not vary across the grating coupler. These different options can be implemented by design of the grating couplers.

In quantum system 100, optical signals travel in only one direction, that is from the illumination system to the QSCs. In an alternative embodiment, quantum-state readout signals are routed in the reverse direction and coupled to a readout unit. In another embodiment, feedback signals are routed from the QSCs or a late stage of a network to an earlier stage of a network to adjust phase delay or some other parameter.

Herein, a "system" is a group of interacting or interrelated elements that act according to a set of rules to form a unified whole. A "process" is a system in which the elements are actions. "Quantum" characterizes a system as exhibiting or using quantum-mechanical phenomena such as eigenstates (solutions to Schrödinger's time dependent or time independent wave equation), superposition, and entanglement. "Quantum states" include eigenstates and superpositions of eigenstates. A "quantum simulator" is a quantum system used to emulate another quantum system. Herein, a "quantum state carrier" (QSC) is any physical system that can assume alternative eigenstates and superpositions of those eigenstates. Examples of QSCs include superconducting circuits, quantum dots in semiconductor hosts, color centers in a solid-state host (e.g., nitrogen-vacuum centers in diamond,) and neutral and charged atoms and molecules.

A "quantum information-processing system" is a quantum system that uses quantum states to represent quantum information". Herein, "information" is organized data. "Bits" are the smallest units of classical information and can assume two values such as logic-0 and logic-1. "Qubits" are the smallest unit of quantum information and can assume values corresponding to points on a unit circle in a complex plane, in other words, values of the form a+bi, wherein a and b are real numbers, i is the square root of negative one (−1), and $a^2+b^2=1$. Qubits and larger units of quantum information (e.g., qutrits and other qudits), can be represented by quantum state carriers with a sufficient number of alternative eigenstates. A "quantum computer system" or "quantum computer" is a quantum information processing system that processes quantum information by manipulating quantum states in accordance with instructions.

Herein, an "array" is an ordered series or arrangement of elements. For example, atoms can be arranged in square array having four rows and four columns, with the rows and columns having the same inter-element spacing. A "quantum array" is an array in which the elements are quantum state carriers.

Herein, "electromagnetic waves" or "EM waves" encompasses ionizing radiation, ultraviolet light, visible light, infrared light, microwaves, and radio waves. Of interest herein, are wavelengths from 10 nanometers (nm) to 100, 000 nm, corresponding to a frequency of range from very-low frequency 3 Kilohertz (kHz) to extreme ultraviolet 30 petahertz (30 PHZ), the visible and near-infrared light being most relevant to the illustrated embodiment. "Electromagnetic radiation" or "EMR" denotes EM waves propagating through space carrying electromagnetic radiant energy. Herein, a "waveguide" is a structure along which propagation of EM waves is confined. For example, a waveguide can be an elongated structure with a relatively high index of refraction bounded by material with a relatively low index of refraction such that internal reflections confine propagating wave to the elongated structure. Herein, an "EM radiator" is a device that converts EM waves propagating in a waveguide to electromagnetic radiation (EMR). For example, the radiator can be a diffraction grating.

Herein, a "network" is a set of devices connected to each other using a physical transmission medium. "Routing" is the process of selecting a path from a source (e.g., laser system) to a destination (e.g., an array site in which a target quantum state carrier resides). Herein, "a single output" implies fewer than two outputs, while having "plural outputs" implies at least two outputs.

Herein, a "delay element" is a structure that causes EM waves to arrive at a destination later than they would without the element. A "controllable" delay element allows the delay to be varied. For example, a waveguide can include a section of material with an electronically controlled index of refraction; the higher the index of refraction, the slower the propagation of the EM waves and the greater the resulting delay. The resulting delay can then result in a phase lag relative to an EM wave that is not delayed (e.g., because it is propagated along a parallel waveguide that lacks such a delay element).

Herein, a "photonic integrated circuit" or "PIC" is a device that integrates multiple (at least two) photonic functions (e.g., waveguides, power splitters, optical amplifiers, optical modulators, filters, lasers, and detectors). Accordingly, a PIC is analogous to an (electronic) integrated circuit and can share many of the benefits associated with integrated circuits, such as miniaturization, cost reductions, reliability, and scalability. Many of the processes (e.g., photolithography) and materials (silicon and gallium arsenide (GaAs) can be used to manufacture PICS with and without integrated electronics. However, some optical functions favor electro-optic crystals such as lithium niobate, while on-PIC semiconductor lasers can be made using GaAs and indium phosphate (InP). Of interest herein are integrated waveguides, optical gratings, and electrical conductors, all of which can be formed in PIC based on silicon, silica on silicon and silicon on insulator.

Herein, all art labeled "prior art", if any, is admitted prior art; all art not labeled "prior art", if any, is not admitted prior art. The illustrated embodiments, modifications thereto, and variations thereupon are provided for by the present invention, the scope of which is defined by the claims.

What is claimed is:

1. A quantum array control process comprising:
    selecting a target quantum-state carrier (QSCs) from an array of QSCs;
    generating electromagnetic (EM) waves for affecting a quantum state of the target quantum-state carrier (QSC);
    receiving, by a routing network, the EM waves by the routing network including Mach-Zehnder interferometers (MZIs) arranged in first, intermediate, and last stages, each MZI of the first, intermediate, and last stages having plural outputs, at least some of the MZIs including delay elements that control a phase along a branch of the MZI;
    controlling one or more of the delay elements so as to route the EM waves to a first EM radiator of a plurality of EM radiators optically coupled to respective QSCs of the array of QSCs, the first EM radiator being optically coupled to the target QSC, wherein each of the plurality of EM radiators receives input from a respective output of the MZIs of the last stage; and
    propagating, by the first EM radiator, the EM waves from the first EM radiator to illuminate the target QSC.

2. The quantum array control process of claim 1 wherein: the EM waves include visible or near infrared light, the target QSC is an atom, the routing network is defined in a photonic integrated circuit, and the EM radiator is an optical grating.

3. The quantum array control process of claim 1 further comprising attenuating the EM waves using MZIs of the last stage, the MZIs of the last stage having respective single outputs.

4. The quantum array control process of claim 1 further comprising, before generating the EM waves, initiating execution of a quantum computer program.

5. The quantum array control process of claim 1 wherein the propagating includes collimating and focusing the EM waves.

6. A quantum array control system comprising:

a routing network of phase-controllable Mach-Zehnder interferometers (MZIs), the routing network having first, intermediate, and final stages, the first stage of the routing network having plural outputs and at least one MZI with an input for receiving electro-magnetic (EM) waves, each stage other than the first stage having plural MZIs having respective inputs coupled to respective outputs of respective MZIs of the preceding stage, the MZIs of the intermediate stages having plural outputs coupled to the inputs of respective MZIs of the succeeding stage, the MZIs of the first, intermediate, and final stages having control inputs for receiving control signals for controlling a phase difference of the MZI that determines a distribution of power to at least one output of the MZI, wherein the MZIs include a controllable delay element for controlling a phase relationship between first and second branches of the MZI;

a plurality of radiators for radiating EM waves received from respective outputs of MZIs of the final stage so that the EM waves illuminate respective quantum state carriers (QSCs) of a QSC array; and a network controller coupled to the controllable delay elements of the MZIs to control phase relationships between the first and second branches of each MZI, wherein each MZI of the final stage has plural outputs, each output of the final stage being coupled to a respective radiator of the plurality of radiators.

7. The quantum array control system of claim 6 wherein: the routing network and the plurality of radiators are defined in a photonic integrated circuit (PIC), the plurality of radiators are grating couplers, and the EM waves are characterized by wavelengths in the range of 10-100,000 nanometers (nm).

8. The quantum array control system of claim 6 wherein each MZI of the final stage is optically coupled to the respective radiator of the plurality of radiators.

9. The quantum array control system of claim 6 wherein each MZI includes:

an input;

the first and second branches;

a splitter for dividing EM waves received at the input of the MZI between the first and the second branches;

a combiner for combining EM waves from the first and second branches to produce interference; and exactly one output or exactly two outputs.

10. The quantum array control system of claim 9 further comprising:

an EM wave source for providing EM waves to an input of an MZI of the first stage; and optical elements for focusing EM radiation from the plurality of radiators to respective QSCs of a quantum array.

\* \* \* \* \*